March 1, 1966 G. J. MICHEL, JR., ETAL 3,238,532
PRODUCTION MONITORING APPARATUS
Filed Dec. 23, 1963 2 Sheets-Sheet 2

INVENTORS.
George J. Michel, Jr.
George Zdzieborski
BY Harness, Dickey & Pierce
ATTORNEYS.

United States Patent Office 3,238,532
Patented Mar. 1, 1966

3,238,532
PRODUCTION MONITORING APPARATUS
George J. Michel, Jr., and George Zdzieborski, Stamford, Conn., assignors to Hancock Telecontrol Corporation, Old Greenwich, Conn., a corporation of Ohio
Filed Dec. 23, 1963, Ser. No. 332,572
3 Claims. (Cl. 346—32)

This invention relates to production monitoring apparatus, and more particularly to devices for continuously indicating the rate of production at various stations in a manufacturing plant relative to prescribed norms.

It is an object of the invention to provide a novel and improved production monitoring apparatus which is capable of plotting efficiency or percentage of job completion at a station producing discrete units of production, and will do so in a continuous and readily visible manner regardless of alterations in the rate of productivity.

It is another object to provide an improved instrument of this character which will be capable of being preset for various rates of production, so that the plot in each case will be solely in relation to the preset rate.

It is a further object to provide an improved mechanism of this character which, in one embodiment, can be used to indicate by special signals variations in either direction from a standard production rate.

It is also an object to provide an improved production apparatus of this nature which is of relatively simple and economical construction, comprising a control unit and a recorder unit which may be placed at various locations.

Other objects, features and advantages of the present invention will become apparent from the subsequent description, taken in conjunction with the accompanying drawings.

In the drawings:

FIGURE 5 is a circuit diagram showing a modified form of the invention in which the servo motor, pen and chart are replaced by a continuously driven rheostat contact and rectifier-controlled relays which operate signal lamps indicating variations from the production norm.

Figure 1:
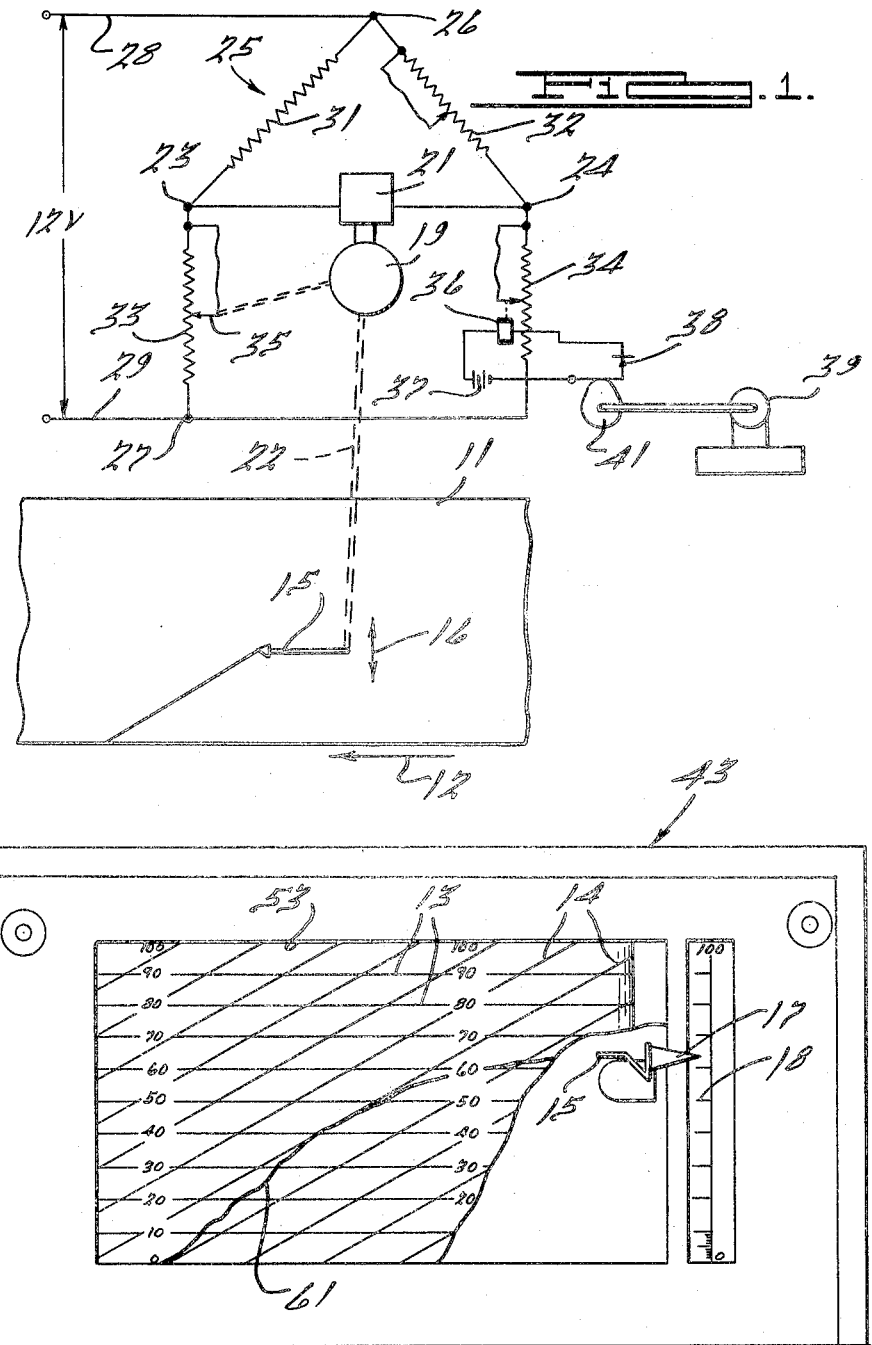
FIGURE 1 is a circuit diagram showing the principles of operation of the invention.

Briefly, the first illustrated embodiment of the invention comprises a paper chart which is continuously moved horizontally and which has marked on it inclined parallel lines indicating a normal rate of production. A pen is adapted to plot a line on this chart and is vertically movable in steps so that the combination of the horizontal paper movement and the vertical pen movement produces a line of greater or lesser inclination, depending upon the frequency of vertical movement of the pen and the distance moved in each step.

The pen movement is controlled by a servo motor and amplifier controlled in turn by a Wheatstone bridge circuit. One branch of this circuit has a fixed resistor in series with a rebalancing potentiometer, the latter being driven synchronously with the recorder pen. The other branch has a presettable input potentiometer in parallel with the limiting resistor, and in series with a piece count potentiometer which is in parallel with the rebalancing potentiometer.

The servo amplifier is connected between the junctures of the limiting resistor and rebalancing potentiometer, and of the rate input potentiometer and piece count potentiometer. The rate input poentiometer is preset in accordance with the standard number of workpieces producible in a fixed period of time, say an eight hour shift. The piece count potentiometer, like the rebalancing potentiometer, starts at zero and increases its resistance during operation. However, the resistance increase of the piece count potentiometer is dependent upon the pieces produced, whereas the resistance increase of the rebalancing potentiometer, and the synchronous pen movement, are dependent upon the setting of the rate input potentiometer as well as the resistance increase in the piece count potentiometer.

In operation, an imbalance in the bridge circuit will be produced when a part is produced, increasing the resistance of the piece count potentiometer. This will cause the servo amplifier to operate the servo motor and move the recorder pen vertically on the horizontally moving chart as well as moving the rebalancing potentiometer to rebalance the bridge. This operation will continue until the total number of pieces have been produced which were considered standard for the fixed time period, such as the eight hour shift. The line plotted by the pen may then, or at any time during the operation, be compared with the standard lines drawn on the chart. A limit switch may be provided for returning the piece count potentiometer to zero after it has reached its full setting, indicating that all the pieces considered standard in the given time period have been produced. This will automatically return the pen and the rebalancing potentiometer to zero.

In another embodiment of the invention, the servo motor, recorder pen and chart paper are eliminated, and the servo amplifier is replaced by a pair of relays in parallel, each relay having a rectifier in series with it, so that one relay will operate when a potential is created in one direction and the other when a potential is created in the opposite direction. The relays control three signal lamps of different colors. The rebalancing potentiometer contact is moved at a constant speed by a separate motor, this speed being preset in accordance with the standard time, such as the eight hour shift, so that the rebalancing rheostat will change from no resistance to full resistance during this period. At the same time, the piece count potentiometer will be increasing its resistance in dependence upon the rate of production. As long as the rebalancing and piece count potentiometers are in balance (the rate input potentiometer having been preset in accordance with the standard number of pieces to be produced in the given time period) neither of the relays will be energized, and one of the signal lamps, such as a green lamp, will be illuminated because of the fact that both relays control normally closed switches in series with this lamp. If the rate of production falls below the standard rate, one of the relays will be energized, opening the green lamp circuit and closing a circuit to, say, a red lamp. If one the other hand the rate of production exceeds the norm, the green lamp will be extinguished and a third lamp, such as a yellow lamp, will be illuminated. This would indicate, for example, that a new supply of stock should be delivered to the work station.

In both embodiments, therefore, it will be possible to continuously monitor the rate of production and its deviation from a norm for a work station, the monitoring being accomplished if desired at a central station. The control unit at the central station may also have registers visually indicating the standard number of parts and the parts actually produced.

Figures 2, 3, 4:
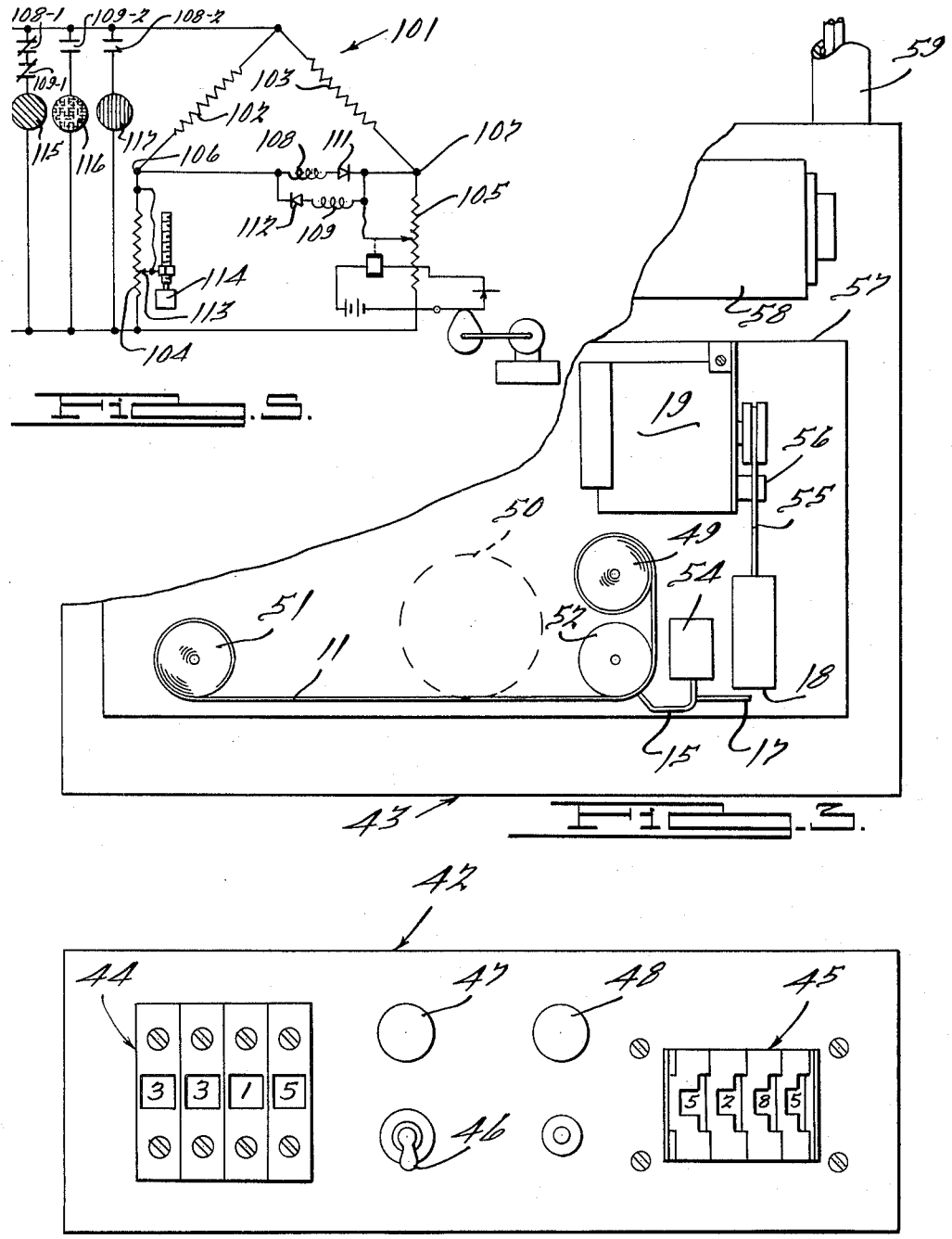
FIGURE 2 is a front elevational view of the recorder unit, showing a plot thereon.
FIGURE 3 is a top plan view of the recorder unit, showing the paper chart rolls and other elements.
FIGURE 4 is a front elevational view of the control unit, showing the readout counter and job setup switches.

Referring more particularly to the drawings, FIGURE 1 shows in schematic fashion a strip chart 11 which is movable from right to left, as indicated by the arrow 12, and has printed on it parallel horizontal lines 13 and diagonal lines 14, as indicated in FIGURE 2. Horizontal lines 13 are numbered to indicate percentage of completion of a job for which the standard total number of pieces for a preselected time period has been preset in the apparatus. In other words, lines 13 are numbered from zero to 100. Inclined lines 13 are in spaced parallel relation and are at a slope corresponding to that which would be drawn by a pen 15 if the actual rate of production corresponds to the ideal or standard rate. As will be later seen, this slope is the same regardless of the standard number of pieces to be produced in a given time period.

Pen 15 is adapted to move vertically, as indicated by the double-ended arrow 16 of FIGURE 1. Each time a part is produced, pen 15 will move upwardly a short step, the length of this step depending upon the presetting of a rate input potentiometer as described below. When the pen has reached the top of the chart, limit switch means controlling the piece count potentiometer will be operated, as described below, causing the latter to return to its zero resistance position and thus reseting the recording mechanism including the return of pen 15 to its lower position on the chart. An indicator 17 may be attached to pen 15, as seen in FIGURE 2, this inidicator moving along a scale 18 for convenience in reading the percentage of completion of the job.

Pen 15 is operated by a servo motor 19 controlled by a servo amplifier 21, the connection between motor 19 and pen 15 being indicated schematically at 22 in FIGURE 1. Amplifier 21 is connected across the output terminals 23 and 24 of a Wheatstone bridge circuit generally indicated at 25. The input terminals 26 and 27 of this bridge circuit are connected across a bridge supply voltage furnished by conduits 28 and 29 respectively. This may, for example, be a 12 volt D.C. supply.

Bridge 25 has a limiting resistor 31 and a rate input potentiometer 32 on one side extending between terminal 26 and terminals 23 and 24 respectively. The circuit also has a rebalancing potentiometer 33 and a piece count potentiometer 34 extending between terminals 23 and 24 respectively, and terminal 27. The parameters of resistances 31 and 33 are so chosen that when contact 35 of potentiometer 33 reaches its full resistance position (the lower position in FIGURE 1) there will be about 11½ volts across resistance 31 and about ½ volt across resistance 33. Rate input potentiometer 32 will therefore be preselected so that when piece count potentiometer 34 reaches a resistance corresponding to the number of pieces for which potentiometer 32 is set, it will have ½ volt across it, with 11½ volts across potentiometer 32. The latter potentiometer may therefore comprise a plurality of ten position or decade switches, one switch for units, one switch for tens, etc., so that a fixed resistance value may be established for every number. As may be later seen, for the parameters used in the present example, potentiometer 32 will be set at 24 ohms for each piece of the standard number producible in the given time period.

Rebalancing potentiometer 33 could have a total resistance of 1,000 ohms, with limiting resistor 31 having a resistance of 23,000 ohms. This would give the required division of voltages described above. Potentiometer 33 is of a slide wire type rather than a step type, and is continuously adjustable to an infinite variety of positions between zero and 1,000 ohms.

Piece count potentiometer 34, like rate potentiometer 32, is movable in steps, but in this case the movement is accomplished by a relay 36 rather than by manual adjustment. Relay 36 is in series with a power source 37 and a switch 38, this switch being closed momentarily each time a part is produced by a machine shown schematically at 39, for example, by a rotatable cam 41 connected to machine 39. Potentiometer 34 will start out at zero resistance and the value of potentiometer 34 may, as an example, be 50 ohms.

The actual construction of the device is shown at least partially in FIGURES 2, 3 and 4. A control unit generally indicated at 42 in FIGURE 4 and a recorder unit generally indicated at 43 and shown in FIGURES 2 and 3 are provided, each of these units comprising a housing or cabinet of rectangular shape. Control unit 42 has a readout counter generally indicated at 44 mounted on the face thereof, this counter being shown as having four digits. Normally, the counter will be set at zero at the beginning of a job and will increase digit by digit as pieces are produced by machine 39. The other side of the front of cabinet 42 has a series of job setup switches generally indicated at 45. These switches control the setting of rate input potentiometer 32 and, as stated before, they comprise four decade switches, one for units, one for tens, one for hundreds and one for thousands. An on-off switch 46 is also provided along with a "power on" indicator lamp 47 and a limit warning lamp 48. These parts, however, are not described in detail since they do not in themselves form part of the present invention.

Cabinet 43 contains a chart feed spool 49, the chart being driven by a chart drive motor 50, and a chart pickup spool 51, a chart drive capstan 52 being provided with the axes of members 51 and 52 in a plane parallel to the cabinet front so that the chart originally wound on spool 49 will move to the left in FIGURES 2 and 3 onto drum 51, being visible through a window 53 at the front of the cabinet. Pen 15 is mounted adjacent capstan 52 which serves as a backup roll for the pen, as seen in FIGURE 3, the pen being connected with an ink cartridge 54. Servo motor 19 is mounted within cabinet 43 and is connected with the pen by a pen drive belt 55.

The automatic reset switch mentioned above is shown schematically at 56 adjacent servo motor 19. All these parts are mounted on a recorder subchassis indicated schematically at 57 within cabinet 43, and a recorder amplifier and power supply is also within the cabinet and is indicated schematically at 58. Both cabinets 42 and 43 for each machine 39 could be located at a central station and could be adjacent or remote from each other, being connected by a cable shown partially at 59 in FIGURE 3.

In operation, let us assume that the resistances in Wheatstone bridge 25 have the following values.

Limiting resistor 31: 23,000 ohms.

Rebalancing potentiometer 33: continuously adjustable between zero ohms and 1,000 ohms.

Rate input potentiometer 32: adjustable in steps of 24 ohms from a value of zero ohms to a value of 9,999 times 24 ohms.

Piece count potentiometer 34: adjustable in steps of 1 ohm from a setting of zero ohm to a setting of 9,999 ohms.

Let us assume that it is required to plot the efficiency or percentage of job completion of a station at which the standard or ideal output rate for a particular workpiece is 50 pieces in eight hours. With 12 volts applied across lines 28 and 29, and with potentiometers 33 and 34, together with pen 15, in their zero positions, potentiometer 32 will be set to a value such that ½ volt will exist across potentiometer 34 when its setting is 50 ohms, that is, when 50 pieces had been produced, since it is desired that potentiometer 33 be at its full 1,000 ohm setting at that time. This would require a current in potentiometer 34 of 0.5 volt divided by 50 ohms, or 0.01 amp. Roughly, then, if we set potentiometer 32 at 12 volts divided by 0.01 amp or 1,200 ohms, we will achieve the desired result. It is true that there would only be 11½ volts rather than 12 volts across potentiometer 32 when potentiometers 34 and 33 reach the values of 50 and 1,000 ohms respectively, so that the calculation of 12 divided by 0.01 is not quite accurate, but it can be demonstrated that any error obtained by the 1,200 ohm setting will be negligible.

The setting of potentiometer 32 will be reflected by the digits indicated on the job setup switch indicators 45 in FIGURE 4.

With this setting, machine 39 will begin to produce pieces, and each time a piece is produced relay 36 will be energized, stepping potentiometer 34 so as to increase the resistance by 1 ohm. At the same time of course, readout counter 44, which was set to zero at the beginning of the operation, will indicate the additional manufactured piece. Servo amplifier 21, which will have been in balance when potentiometers 33 and 34 were set at zero, will be unbalanced by the 1 ohm resistance in potentiometer 34. This will cause servo motor 19 to drive pen 15 vertically upwardly about 2% of the distance between the zero line and the 100% line on chart 11, the chart being moved continuously leftwardly in FIGURE 2 by motor 50, and a rate such that it will travel a distance in eight hours equal to the horizontal projection of any line 14. The reason for the above-described movement of pen 15 is that motor 19 will drive contact 35 along slide wire potentiometer 33 simultaneously with the movement of pen 15 until the potential between terminals 23 and 24 is eliminated. The amount of movement of contact 35 (and therefore of pen 15) will depend upon the rate input potentiometer 32, and in this case will result in a setting of potentiometer 33 of about 20 ohms. When this setting is achieved, motor 19 will stop until the next piece is produced, upon which potentiometer 34 will again be advanced by relay 36, and the resulting imbalance across servo amplifier 21 will advance pen 15 and contact 35 the same amounts as previously.

This action will continue as long as pieces are produced, and the line 61 drawn on chart 11 by pen 15 will reflect the efficiency of production or output rate as well as indicating the percentage of job completion in terms of the standard amount for eight hours. It may be observed at this point that if management or the supervisory personnel are interested only in the percentage of job completion rather than the efficiency, for a required total number of parts, the required total number may be preset on potentiometer 32 (and indicators 45) in which case the rate of advance of chart 12 will be immaterial.

Line 61 shows, for example, that at the beginning of a job the efficiency could be greater than the standard efficiency since the first part of line 61 has a greater slope, on the average, than the lines 14 which represent standard efficiency. The middle portion of line 61 is at about standard efficiency, while the last portion tapers off to a lesser slope, indicating a less than standard efficiency.

In any case, line 61 will continue to be drawn until all 50 pieces have been produced. Potentiometer 34 will then have reached its full setting of 50 ohms, thus driving potentiometer 33 to its full setting of 1,000 ohms in order to balance the bridge circuit. The horizontal distance traveled by line 61 on chart 11 could be greater or less than that representing an eight hours period, depending upon the average efficiency. If the average efficiency was equal to standard, the horizontal distance would have been equivalent to eight hours. In any case, at this point the limit switch mentioned above will cause potentiometer 34 to be returned to its zero position, and the resulting imbalance across amplifier 21 will cause motor 19 to drive pen 15 and contact 35 back to their zero positions.

Assuming that machine 39 is still producing parts, pen 15 and the other elements of the unit will again start operating in the same manner as before. A person looking at the chart could thus gain a continuous observance of efficiency, since pen 15 will have been returned in a very rapid manner so as not to occupy any substantial horizontal distance on the chart.

In another example, let us assume that 100 pieces are to be produced. In this case, potentiometer 32 should initially be set so that ½ volt will exist across potentiometer 34 when 100 ohms are set in this potentiometer. In other words, a current of 0.005 amp should be passing through potentiometer 34 when it is set at 100 ohms. Thus, 12/0.005 or 2,400 ohms should be initially set in potentiometer 32. This coincides with what was described previously, namely, that potentiometer 32 is set at 24 ohms for every piece to be produced in the standard time, or for every piece to be produced regardless of the time if one is only interested in observing percentages of job completion.

With the 2,400 ohm setting in potentiometer 32, and potentiometers 33 and 34 starting at zero, together with pen 15, each piece produced by machine 39 will advance potentiometer 34 1 ohm, and the resulting imbalance in the bridge circuit will cause pen 15 to advance upwardly and contact 35 to increase the resistance of potentiometer 33. The step-by-step increase of potentiometer 33 and pen 15 will be only half what they were in the previous example, or namely, about 10 ohms per step for potentiometer 33 and 1% of the distance between the zero and 100% lines for pen 15. At the end of the completion of 100 pieces, potentiometers 34 and 35 will have reached their upper limits along with pen 15 and will then automatically be returned to their lower limits.

It is thus seen that a novel and improved monitoring apparatus has been provided which is capable of instantaneously plotting and indicating not only percentage of completion of a given job requiring a certain total number of pieces, but also the minute-by-minute and overall operating efficiencies at a work station if a standard output rate has previously been chosen.

FIGURE 5 shows in schematic fashion a modified form of the invention which is generally similar to the first embodiment but in which the chart and the continuous record thereon are replaced by three signal lamps indicating a normal rate of production or deviations from the norm. In this case the Wheatstone bridge is generally indicated at 101 and has a limiting potentiometer 102, a rate input potentiometer 103, a motor-driven potentiometer 104 and a piece count potentiometer 105, potentiometer 104 being the equivalent of the rebalancing potentiometer 33. However, instead of servo amplifier 21 there are located between junctions 106 and 107 of bridge 101, a pair of relays 108 and 109 in parallel. The relays have rectifiers 111 and 112, respectively, in series with them so that relay 108 will only carry current in one direction and relay 109 will only carry current in another direction.

The contact 113 of potentiometer 104 is driven by a constant speed motor 114. This motor may be so set that it will drive contact 113 from its zero resistance to its full resistance position in a given time, say eight hours. Potentiometer 103 will be preset in accordance with the standard number of parts to be produced in this given time. This presetting will be the same as that described above with respect to potentiometer 32, that is, the higher the standard number of pieces, the higher will be the setting of potentiometer 103.

A plurality of lamps 115, 116 and 117 are connected in parallel across a power source, such as the power input source for bridge 101. Lamp 115 may be, for example, green, and will have two normally closed switches 108–1 and 109–1, controlled by relays 108 and 109 respectively. Lamp 116 may be a yellow lamp with a normally open switch 109–2 in series with it, this switch being controlled by relay 109. Lamp 117 may be a red lamp with a switch 108–2 in series with it, the switch being controlled by relay 108.

In operation of the embodiment of FIGURE 5, let us assume that 100 pieces in eight hours is the standard rate of production. In this case, potentiometer 103 would be set manually at 2,400, ohms, as in the second example given above, and with both potentiometers 104 and 105 starting at zero, motor 114 would be continuously energized from the beginning of the time period. Potentiometer 105 will be stepped to increase its resistance as each piece is produced and as long as the bridge remains balanced, only lamp 115 will be illuminated. If the rate of production exceeds the standard rate, the resistance of potentiometer 105 will increase more than the resistance of potentiometer 104. This will cause an imbalance in bridge circuit 101 tending to energize relay 109. Lamp 115 will thus be extinguished and lamp 116 illuminated, indicating that the supervisory personnel should take whatever action may be necessary in view of the higher rate of production. Such action may, for example, include replacement of stock at the machine. If the rate of production then slows down to its standard rate, lamp 116 will still be illuminated, and it will only be after the rate of production slows down enough so that the average rate from the beginning is about standard that lamp 116 will be extinguished and lamp 115 will again be illuminated.

Should the average rate of production from the beginning drop below the standard, the setting of potentiometer 104 will move ahead of the setting of potentiometer 105, and current will flow in the unbalanced bridge through relay 108. This will again extinguish lamp 115 but illuminate instead lamp 117. This will indicate to the supervisory personnel that corrective action may be needed at the station because of the lower production rate. The red lamp will remain illuminated even though the production again picks up, until the average production rate from the beginning again reaches the standard level. At this time lamp 117 will extinguish and lamp 115 will again be illuminated.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a production monitoring apparatus, a Wheatstone bridge having first and second input terminals and first and second output terminals, a limiting resistor and a rate input potentiometer connected between the first input terminal and said first and second output terminals respectively, a continuously adjustable potentiometer connected between said first output terminal and said second input terminal, a piece count potentiometer connected between said second output terminal and said second input terminal, means for manually setting said rate input potentiometer at any of a predetermined number of discrete settings varying from each other by the same amount, means for stepping said piece count potentiometer in equal increments in response to the production of pieces at a work station, means for adjusting said continuously adjustable potentiometer to an infinite number of settings between zero and a predetermined maximum resistance, means indicating the production rate of said pieces relative to a standard production rate, and means connected between the output terminals of said bridge and responsive to an imbalance therebetween to operate said last-mentioned means.

2. In a production monitoring apparatus, a Wheatstone bridge having first and second input terminals and first and second output terminals, a limiting resistor and a rate input potentiometer connected between the first input terminal and said first and second output terminals respectively, a continuously adjustable potentiometer connected between said first output terminal and said second input terminal, a piece count potentiometer connected between said second output terminal and said second input terminal, means for manually setting said rate input potentiometer at any of a predetermined number of discrete settings varying from each other by the same amount, means for stepping said piece count potentiometer in equal increments in response to the production of pieces at a work station, means for adjusting said continuously adjustable potentiometer to an infinite number of settings between zero and a predetermined maximum resistance, said last-mentioned means comprising a servo amplifier connected between the output terminals of said bridge and a servo motor controlled by said servo amplifier and connected to said continuously adjustable potentiometer, a chart, means for continuously moving said chart in one direction, and scribing means connected to said servo motor and movable thereby in a direction perpendicular to the direction of chart movement.

3. In a production monitoring apparatus, a Wheatstone bridge having first and second input terminals and first and second output terminals, a limiting resistor and a rate input potentiometer connected between the first input terminal and said first and second output terminals respectively, a continuously adjustable potentiometer connected between said first output terminal and said second input terminal, a piece count potentiometer connected between said second output terminal and said second input terminal, means for manually setting said rate input potentiometer at any of a predetermined number of discrete settings varying from each other by the same amount, means for stepping said piece count potentiometer in equal increments in response to the production of pieces at a work station, means for adjusting said continuously adjustable potentiometer to an infinite number of settings between zero and a predetermined maximum resistance, said last-mentioned means being operable at a constant rate, a pair of relays in parallel connected between the output terminals of said bridge, rectifiers in series with said relays so that each relay will carry current in only one direction, three electrically energizable indicators connected in parallel across a power source, first and second normally closed switches in series with one of said indicators, said switches being controlled by said two relays, respectively, a third normally open switch in series with said second indicator and controlled by one of said relays, and a fourth normally open switch in series with said third indicator and controlled by the other relay.

References Cited by the Examiner
UNITED STATES PATENTS

| | | | |
|---|---|---|---|
| 2,792,542 | 5/1957 | Robinson | 324—100 X |
| 2,850,684 | 9/1958 | Klein et al. | 317—153 |
| 3,141,966 | 7/1964 | Milnes | 340—285 X |

LEO SMILOW, *Primary Examiner.*

NORTON ANSHER, *Examiner.*